US012769192B2

(12) United States Patent
Li et al.

(10) Patent No.: US 12,769,192 B2
(45) Date of Patent: Oct. 20, 2026

(54) TELESCOPIC ROD FOR PHOTOGRAPHIC EQUIPMENT

(71) Applicant: Guangdong Sirui Optical Co., Ltd., Zhongshan (CN)

(72) Inventors: Jie Li, Zhongshan (CN); Jiongyu Lu, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

(21) Appl. No.: 18/933,775

(22) Filed: Oct. 31, 2024

(65) Prior Publication Data

US 2025/0138401 A1 May 1, 2025

(51) Int. Cl.
*F16M 13/04* (2006.01)
*G03B 17/56* (2021.01)

(52) U.S. Cl.
CPC ........... *G03B 17/563* (2013.01); *F16M 13/04* (2013.01); *G03B 17/561* (2013.01)

(58) Field of Classification Search
USPC .......................................................... 396/421
See application file for complete search history.

(56) References Cited

FOREIGN PATENT DOCUMENTS

| | | | | |
|---|---|---|---|---|
| CN | 213271967 U | * | 5/2021 | |
| CN | 216217012 U | * | 4/2022 | |
| CN | 219509965 U | * | 8/2023 | ............ F16M 13/04 |

* cited by examiner

*Primary Examiner* — Walter L Lindsay, Jr.
*Assistant Examiner* — Warren K Fenwick
(74) *Attorney, Agent, or Firm* — Loeb & Loeb LLP

(57) ABSTRACT

A telescopic rod with an elastic damping structure comprises at least two sections of tube which are sleeved in sequence and arranged between two adjacent sections of the tube. The two adjacent sections include an inner tube and an outer tube, and the elastic damping structure comprises a damping member and an elastic member. The damping member is arranged between the end of the inner tube and the inner wall of the outer tube, one end of the elastic member abuts against the damping member, and the other end abuts against the inner wall of the inner tube, and the elastic force of the elastic member drives the inner tube, the damping member and the outer tube to fit tightly.

10 Claims, 7 Drawing Sheets

B

A

TELESCOPIC ROD FOR PHOTOGRAPHIC EQUIPMENT

TECHNICAL FIELD

Aspects of the invention generally relate to telescopic rods. In particular, embodiments of the invention relate to a telescopic rod with an elastic damping structure.

BACKGROUND

Currently, telescopic rods or tripods in the industry are generally used for selfie stick-type with light-loading devices. In order to provide stable support for such products, the damping positioning structure in the telescopic rod must be able to provide stable and lasting resistance on the one hand to meet the telescopic rod's load-bearing requirements for mobile phones and sports cameras and, on the other hand, the resistance of the damping positioning structure cannot be too large, so as to hinder manual extension and extension of the telescopic rod due to excessive resistance. In addition, the telescopic rod is mainly used to provide support for photographic equipment, so it is necessary to minimize the vibration and jitter caused by the gap between elements of the telescopic rods.

Also, presently, there are mainly two types of damping positioning structures used in the telescopic rod industry:

The first kind is to set a damping plate between two adjacent sections of telescopic tubes, and use the resistance generated by the damping plate being squeezed and deformed between the two adjacent tubes to achieve the damping positioning of the two sections of the tube. This configuration, at the same time, would enable the damping plate to eliminate the gap between the two sections of the tube to reduce the gap jitter. However, since the damping plate is generally made of plastic, and the fatigue strength of the plastic itself is poor, the resistance generated by the damping plate extrusion deformation will deteriorate quickly over time. When used in high or low temperature outdoor environments, the resistance will deteriorate faster, and thus cannot provide stable and lasting resistance to accommodate the intended use.

The second type is to use a spring to provide a stable elastic force to compress the damping plate, and the damping plate generates a stable resistance between the two adjacent layers of the tube. However, in the current industry, this type of spring structure, while the spring is used to open the two damping plates, the space occupied by the spring itself creates a gap between the two layers of the tube, making the telescopic rod more prone to vibration.

SUMMARY

Therefore, aspects of the invention attempt to solve or overcome the defects of the existing technology that the internal damping structure of the telescopic rod has a large gap causing it to easy to vibrate during use and is difficult to provide effective support for the components installed thereon in a sustained use and in a stable manner.

In order to address the above technical problems, aspects of the invention provide at least one technical solution as follows:

A telescopic rod with an elastic damping structure comprises at least two sections of tube which are sequentially sleeved from the inside to the outside and may be axially telescopic. In one embodiment, the elastic damping structure may be arranged between two adjacent sections of the tube.

In one embodiment, the two adjacent sections of the tube may include an inner tube and an outer tube. In some embodiments, the elastic damping structure may include a damping member and an elastic member. In one aspect, the damping member may be arranged between n end of the inner tube and an inner wall of the outer tube. In some embodiments, one end of the elastic member may abut against the damping member, and the other end may abut against the inner wall of the inner tube. In some embodiments, the elastic force of the elastic member may drive the inner tube, the damping member and the outer tube to fit closely. In some embodiments, the damping member and the inner wall of the outer tube form friction damping, the inner tube may slide along the inner wall surface of the outer tube through the damping member and may maintain in the relative position after sliding through the damping member.

Further, in some embodiments, the damping member may include a damping sleeve disposed between the outer wall of the inner tube and the inner wall of the outer tube. In some embodiments, the telescopic rod may include a mounting base plate connected to the damping sleeve and extending toward the end surface of the inner tube. In one embodiment, the mounting base plate may include a mounting seat extending into the inner cavity of the inner tube. In one aspect, one end of the elastic member may abut against the mounting seat, and the other end may abut against the inner wall of the inner tube.

Further, in some embodiments, a mounting groove may include an opening at one end in the mounting seat. In some embodiments, a part of the elastic member may be disposed in the mounting groove, and the other part may extend out of the opening of the mounting groove and may abut against the inner wall of the inner tube.

Further, in some embodiments, a mounting hole may be disposed at the tube wall of the inner tube, and a positioning boss protruding outward and extending into the mounting hole may be disposed at the inner wall of the damping sleeve.

Further, in some embodiments, the damping sleeve may include a first damping sleeve and a second damping sleeve which may be on the same circular ring and may be independently arranged. In one aspect, the first damping sleeve and the second damping sleeve both may include a disconnection gap between the two ends along the circumferential direction of the circular ring. In some embodiments, there may be two mounting holes on the inner tube and they may be arranged oppositely. In one aspect, the inner walls of the first damping sleeve and the second damping sleeve may both include positioning bosses which may protrude inward and may extend into the corresponding mounting holes. In some embodiments, the mounting base plate may be fixedly connected to the first damping sleeve, and the elastic expansion and contraction direction of the elastic member may be the same as the connecting direction of the two positioning bosses.

Further, in some embodiments, the first damping sleeve may include an elastic structure which may curve or arch inward to elastically counteract the outer wall of the inner tube.

Further, in some embodiments, the connecting direction of the two disconnection gaps may be perpendicular to the connecting direction of the two positioning bosses.

Further, in some embodiments, the inner wall of the outer tube may include two positioning ribs which may be on the same circular ring as the damping sleeve. In some embodiments, the two positioning ribs respectively may pass through the disconnection gaps between the damping sleeves at corresponding positions.

Further, in some embodiments, the mounting hole on the inner tube may be disposed at the positioning rib of the inner tube.

Further, in some embodiments, a reinforcing boss may disposed at the positioning boss of the damping sleeve and may be coaxially arranged with the positioning rib on the inner tube, and the inner wall surface of the reinforcing boss may protrude from the inner wall surface of the inner tube.

Further, in some embodiments, the positioning rib on the inner tube and the positioning rib on the outer tube may be arranged at about 90 degrees.

Aspects of the invention may include one or more of the following advantages:

1. The telescopic rod with elastic damping structure provided by the invention may include a damping member arranged between the end of the inner tube and the inner wall of the outer tube. In some embodiments, an elastic member may be arranged between the damping member and the inner wall of the inner tube. During the sliding of the inner tube and the damping member along the inner wall of the outer tube, in some embodiments, the elastic force of the elastic member may act on the inner tube and may transmit to the outer tube through the damping member, so that the inner tube, the damping member and the outer tube may be kept in close fit. This, in one aspect, may perfectly eliminate the matching gap, overcoming the vibration of the telescopic rod caused by the matching gap between the internal tube bodies, and providing a more durable and stable support for the shooting or photographic device supported on the telescopic rod. Compared with the method of forming friction damping by using the deformation of the damping member made of plastic material itself in the prior art, aspects of the invention of applying elastic force to the damping member to form friction damping with the inner wall of the outer tube may avoid the resistance attenuation caused by material fatigue and external temperature environment, and is also conducive to provide a more durable and stable support for the shooting device supported on the telescopic rod.

2. The telescopic rod with elastic damping structure of embodiments of the invention may include a mounting base plate extending toward the end face of the inner tube by connecting the damping sleeve to a mounting base plate, and a mounting seat located in the outer cavity of the inner tube may be disposed at the mounting base plate. In some embodiments, one end of the elastic member may be against the mounting base plate, and the other end may be against the inner wall of the inner tube. In one aspect, in this way, the elastic member may be placed in the inner cavity of the inner tube without occupying the space between the inner tube and the outer tube, which is conducive to eliminating the gap between the inner tube, the damping sleeve and the outer tube, and eliminating the vibration caused by the gap. These are advantages of embodiments of the invention, as compared with the method of setting both the elastic member and the damping member between the outer wall of the inner tube and the inner wall of the outer tube in the prior art.

3. The telescopic rod with elastic damping structure provided by embodiments of the invention may include a structural form in which the elastic member is set in the mounting groove in the mounting seat. In one embodiment, the mounting groove may provide an installation space for the elastic member and limit the elastic expansion direction, which is conducive to improving the stability of the elastic member installation structure.

4. The telescopic rod with elastic damping structure provided by embodiments of the invention may include a mounting hole on the tube wall of the inner tube, and the damping sleeve may realize the positioning and installation matching of the damping sleeve and the inner tube by matching the positioning boss on the inner wall with the mounting hole on the inner tube.

5. The telescopic rod with elastic damping structure provided by embodiments of the invention may include a damping sleeve composed of a first damping sleeve and a second damping sleeve that are independent of each other. In one embodiment, the first damping sleeve and the second damping sleeve may be respectively installed on the ends of the inner tube, and the assembly operation of the damping sleeve is more convenient.

6. The telescopic rod with elastic damping structure provided by embodiments of the invention may include an elastic structure which is arched inwardly to elastically abut against the outer wall of the inner tube on the first damping sleeve. One end of the elastic member abuts against the inner wall of the inner tube so that the inner tube, the second damping sleeve and the outer tube are closely fitted, thereby eliminating the gap between the inner tube, the second damping sleeve and the outer tube. The other end of the elastic member abuts against the first damping sleeve through the mounting seat so that the first damping sleeve and the outer tube are closely fitted, thereby eliminating the gap between the first damping sleeve and the outer tube. However, under normal circumstances, if the inner tube is fitted with the second damping sleeve under the action of the elastic member, it is bound to cause the inner tube to abut against the first damping sleeve on the other side. The increase of the gap between the sleeves may also cause the telescopic rod to shake. This solution sets an elastic structure that arches inward on the first damping sleeve, and the elastic structure can offset the outer wall of the inner tube elastically, thereby strategically eliminating the gap between the inner tube and the first damping sleeve. Not only does it make the overall telescopic rod structure less likely to vibrate due to the gap, but also it may maintain a close fit between the various components when there is a small amount of processing or moving error in the inner tube, outer tube, first damping sleeve, and second damping sleeve, greatly reducing the dimensional accuracy control requirements for the inner tube, outer tube, first damping sleeve, and second damping sleeve, which is conducive to reducing costs.

7. The telescopic rod with an elastic damping structure provided by embodiments of the invention may include two positioning ribs on the outer tube that pass through the two disconnected intervals on the damping sleeve respectively, and the positioning ribs play a role in guiding the movement of the damping sleeve, making it convenient for the damping sleeve and the inner tube to slide along the positioning ribs on the outer tube.

8. The telescopic rod with elastic damping structure provided by embodiments of the invention has a mounting hole on the inner tube opened on the positioning rib of the inner tube, so that the mounting boss on the damping sleeve may be thickened according to the size of the positioning rib, so that the connection strength between the damping sleeve and the inner tube is stronger, more resistant to the impact when the telescopic rod is repeatedly pulled out, which is conducive to improving the service life of the telescopic rod.

9. The telescopic rod with elastic damping structure provided by embodiments the invention has a positioning rib on the inner tube and the positioning rib on the outer tube arranged at about 90 degrees, and the overall strength and stability of the telescopic rod are higher after being stretched out. Compared with the arrangement of all ribs on the multi-section tube body in the same direction of the existing telescopic rod, it avoids the problem that the inner tube body of the telescopic rod is weakly supported in the direction without ribs, which is easy to shake.

10. Compared with the prior art of controlling the magnitude of the damping force by high-precision control of the local deformation of the damping member, the telescopic rod with elastic damping structure provided by the invention greatly reduces the requirements for the dimensional accuracy control of the inner diameter of each tube body and the inner and outer diameters of the damping member. The overall processing and production of the telescopic rod is more convenient and easy, the production cost is lower, and it can provide stable damping in different harsh environments for a long time, ensuring the performance of the product.

BRIEF DESCRIPTION OF DRAWINGS

In order to more clearly illustrate the specific embodiments of the present invention or the technical solution in the prior art, the following will briefly introduce the drawings required for the specific implementation or the prior art description. Obviously, the drawings described below are some implementations of the present invention. For those skilled in the art, other drawings may be obtained based on these drawings without creative work.

Reference number keys: 100, telescopic rod; 1, inner tube; 11, mounting hole; 2, outer tube; 3, damping member; 4, elastic member; 5, positioning rib; 31, damping sleeve; 31*a*, first damping sleeve; 31*b*, second damping sleeve; 311, positioning boss; 312, reinforcing boss; 313, disconnecting interval; 314, elastic structure; 32, mounting base; 33, mounting seat.

DETAILED DESCRIPTION

The technical solution of the aspects of present invention will be described clearly and completely below in conjunction with the accompanying drawings. Obviously, the described embodiments are part of the embodiments of the present invention, not all of the embodiments. Based on the embodiments of the present invention, all other embodiments obtained by ordinary technicians in the field without creative work are within the scope of protection of the present invention.

In the description of the present invention, it should be noted that the orientation or position relationship indicated by the terms "center", "up", "down", "left", "right", "vertical", "horizontal", "inside", "outside", etc. is based on the orientation or position relationship shown in the accompanying drawings, which is only for the convenience of describing the present invention and simplifying the description, rather than indicating or implying that the device or element referred to must have a specific orientation, be constructed and operated in a specific orientation, and therefore cannot be understood as a limitation of the present invention. In addition, the terms "first", "second", and "third" are only used for descriptive purposes and cannot be understood as indicating or implying relative importance.

In the description of the present invention, it should be noted that, unless otherwise clearly specified and limited, the terms "installation", "connection" and "connected" should be understood in a broad sense, for example, it can be a fixed connection, a detachable connection, or an integral connection; it can be a mechanical connection or an electrical connection; it can be a direct connection, or it can be indirectly connected through an intermediate medium, or it can be the internal communication of two components. For ordinary technicians in this field, the specific meanings of the above terms in the present invention can be understood according to specific circumstances.

Figure 1:
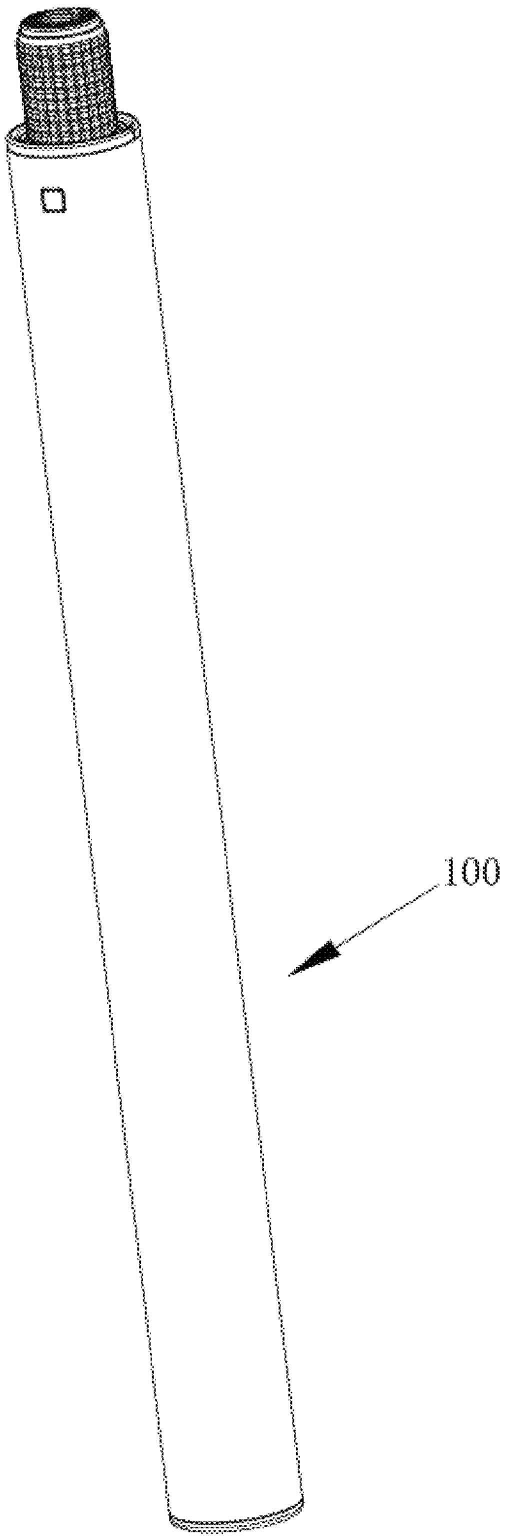
FIG. 1 is a schematic diagram of the three-dimensional structure of the telescopic rod with an elastic damping structure in the embodiment of the invention.
Figure 2:
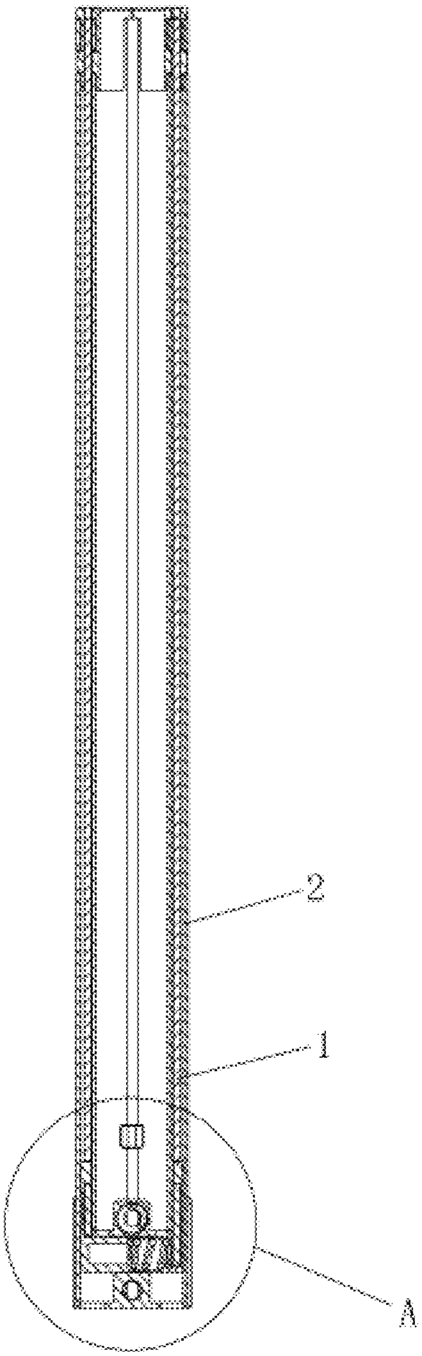
FIG. 2 is a cross-sectional view of the first surface of the telescopic rod with an elastic damping structure in the embodiment of the invention, in which part of the structure is hidden, and only the connection relationship between the multi-layer tube body and the elastic damping structure is shown.
Figure 3:
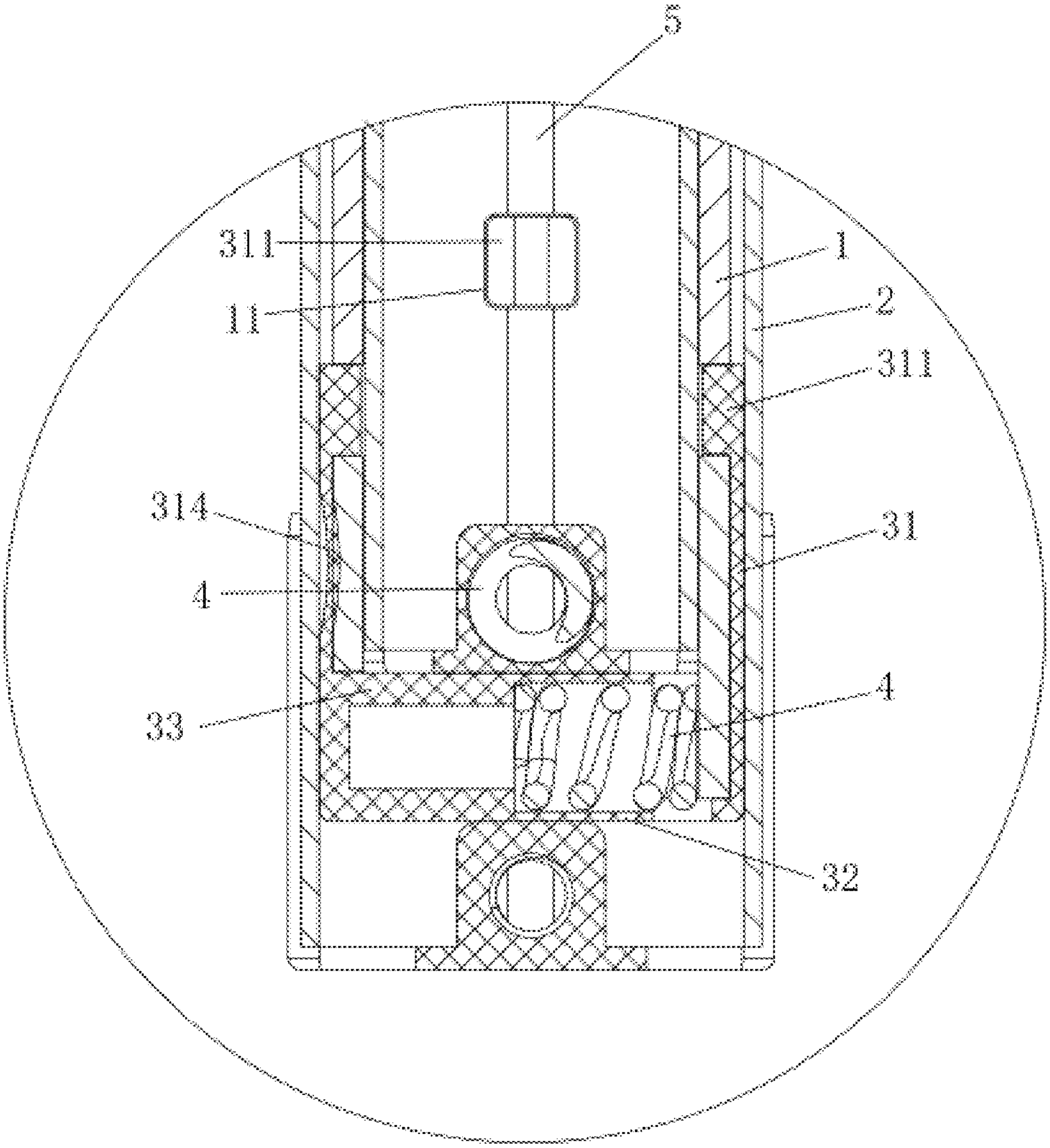
FIG. 3 is an enlarged view of point A in FIG. 2.
Figure 4:
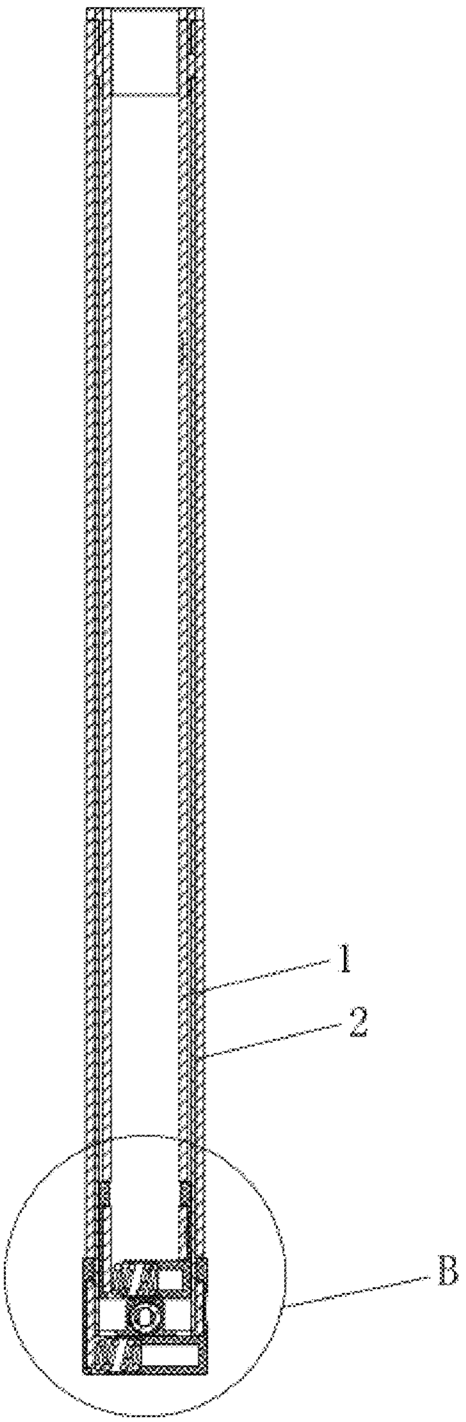
FIG. 4 is a cross-sectional view of the second surface of the telescopic rod with an elastic damping structure in the embodiment of the invention; in which part of the structure is hidden, and only the connection relationship between the multi-layer tube body and the elastic damping structure is shown.
Figure 5:
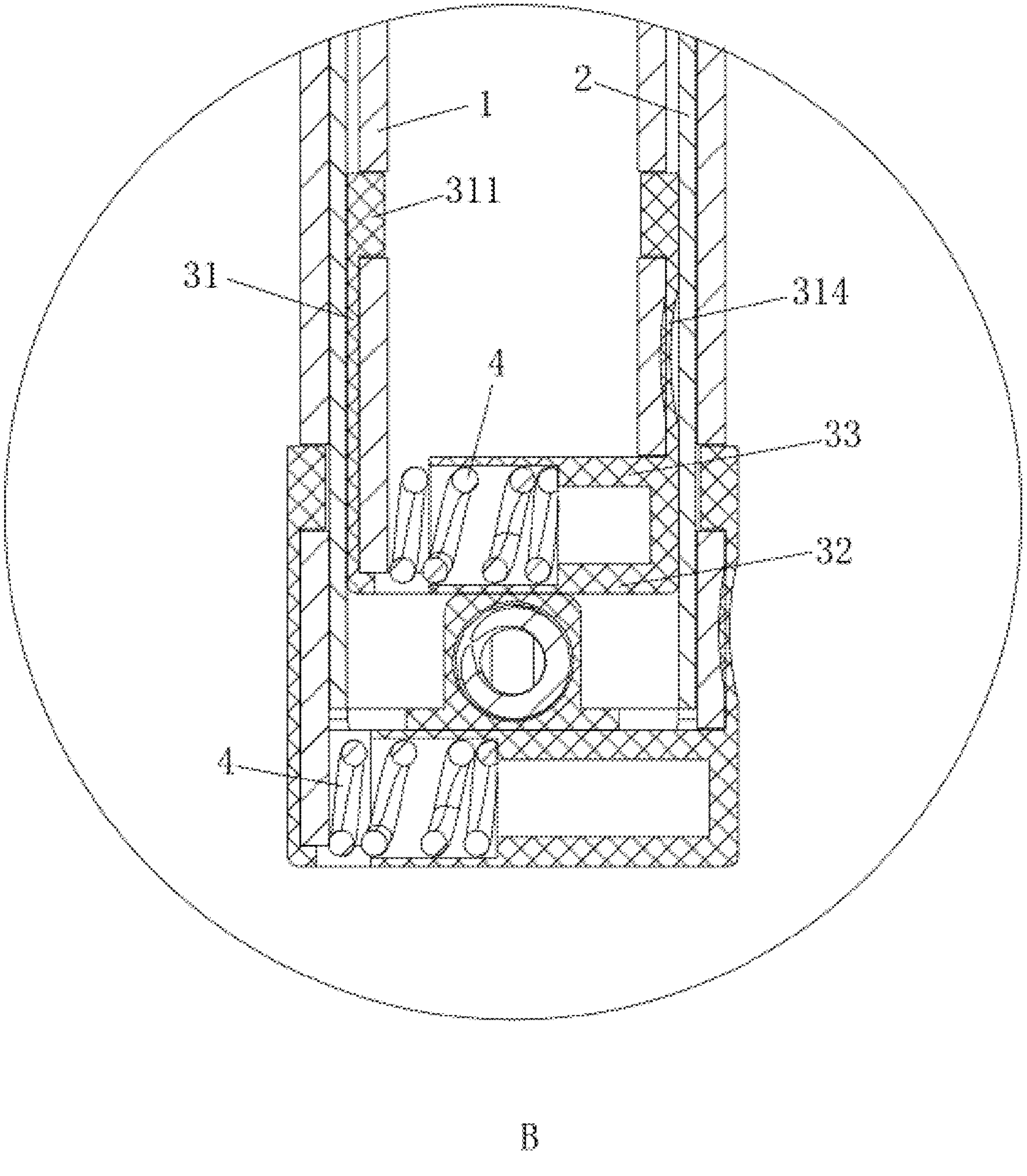
FIG. 5 is an enlarged view of point B in FIG. 4.
Figure 6:
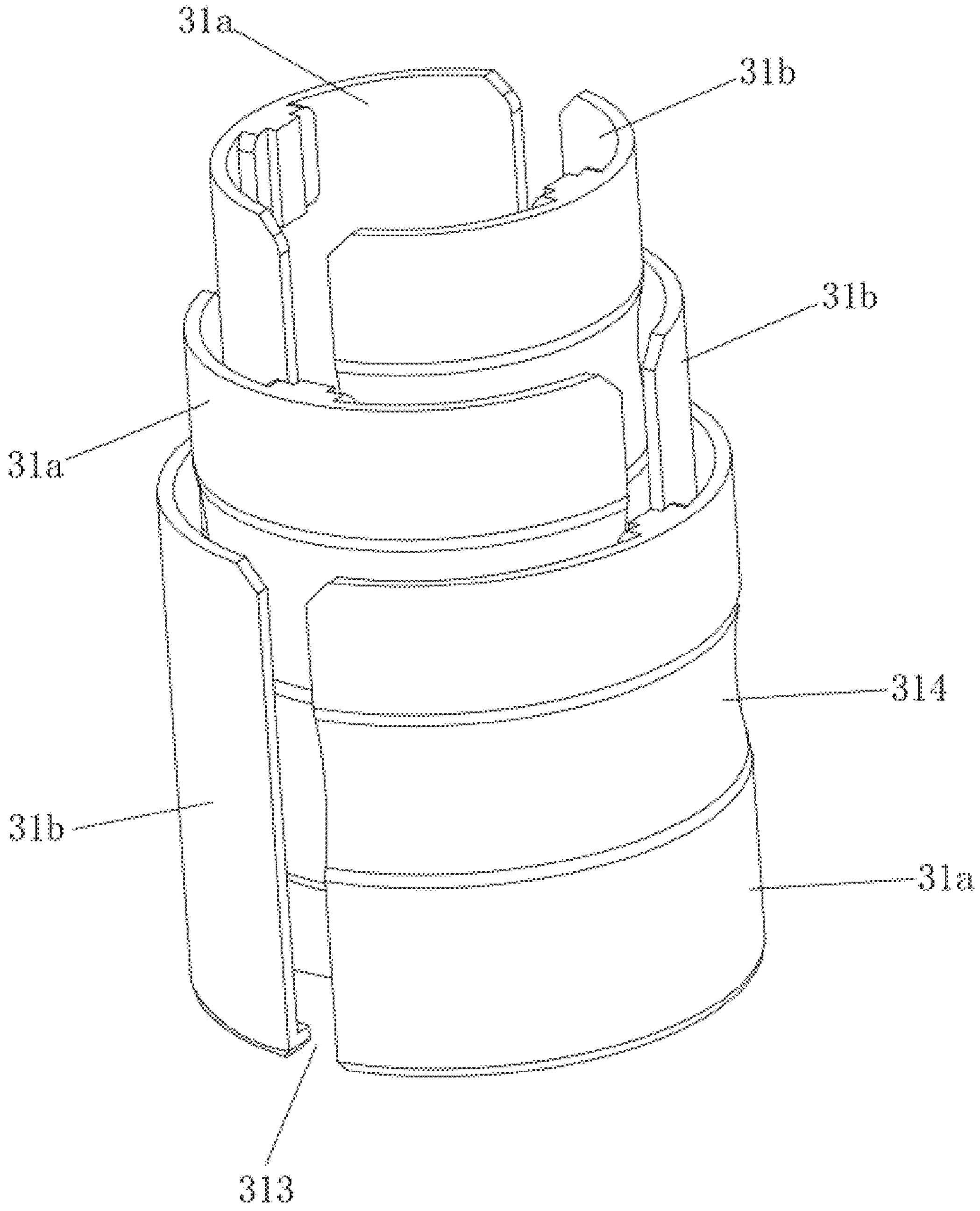
FIG. 6 is a schematic diagram of the three-dimensional structure of the three-layer elastic damping structure in the embodiment of the invention.
Figure 7:
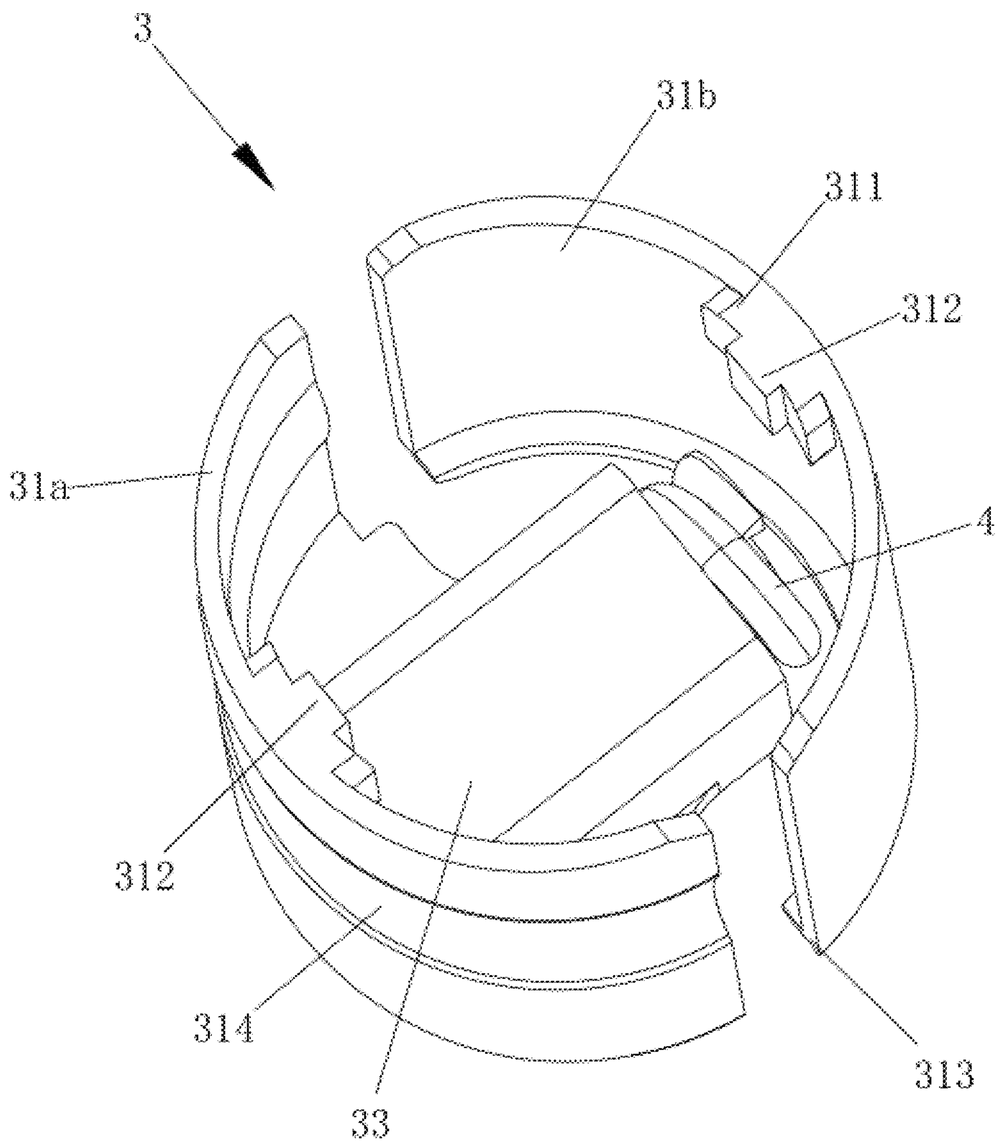
FIG. 7 is a schematic diagram of the three-dimensional structure of the damping member in the embodiment of the invention.

As shown in FIGS. 1-7, diagrams show a telescopic rod with an elastic damping structure according to one embodiment. In some embodiments, the telescopic rod 100 includes a plurality of tubes that are sequentially sleeved from the inside to the outside and can be axially telescopic, and an elastic damping structure disposed between two adjacent tubes. For the convenience of description, in one example, an inner tube of the two adjacent tubes is referred to as the inner tube 1, and the outer tube is referred to as the outer tube 2. In one example, the inner tube 1 and the outer tube 2 are relative. In some embodiments, the inner tube 1 is the inner tube 1 relative to the outer tube, but is the outer tube 2 relative to the inner tube, and the same is true for the outer tube 2.

In one embodiment, the elastic damping structure includes a damping member 3 and an elastic member 4. In some embodiments, the damping member 3 is arranged between the end of the inner tube 1 and the inner wall of the outer tube 2. In one embodiment, one end of the elastic member 4 may abut against the damping member 3, and the other end abuts against the inner wall of the inner tube 1. In some embodiments, the elastic force of the elastic member 4 may drive the inner tube 1, and the damping member 3 and the outer tube 2 to fit closely, so that the damping member 3 and the inner wall of the outer tube 2 form friction damping. In another embodiment, the inner tube 1 slides along the inner wall of the outer tube 2 through the damping member 3 and is maintained in the relative position after sliding through the damping member 3. In the process of the inner tube 1 and the damping member 3 sliding along the inner wall of the outer tube 2, the elastic force of the elastic member 4 may act on the inner tube 1 and such force is transmitted to the outer tube 2 through the damping member 3, so that the inner tube 1, the damping member 3 and the outer tube 2 may keep a close fit.

In such an embodiment, aspects of the invention perfectly eliminate the matching gap among the three, while overcoming the vibration of the telescopic rod 100 caused by the matching gap between the internal tube. In some embodiments, aspects of the invention provide a more durable and stable support for the shooting device supported on the telescopic rod 100. Compared with the method of forming friction damping by deforming the damping member 3 made of plastic material itself in the prior art, embodiments of the invention provide the elastic member 4 to apply an elastic force to the damping member 3 to form friction damping with the inner wall of the outer tube 2 while avoiding the resistance attenuation caused by material fatigue and external temperature environment, and is also conducive to providing more durable and stable support for the shooting device supported by the telescopic rod 100.

In some embodiments, the damping member 3 includes a damping sleeve 31 disposed between the outer wall of the inner tube 1 and the inner wall of the outer tube 2, and a mounting base plate 32 connected to the damping sleeve 31 and extending toward the end surface of the inner tube 1, and a mounting seat 33 extending into the inner cavity of the inner tube 1 disposed on the mounting base plate 32. In some embodiments, one end of the elastic member 4 abuts against the mounting seat 33, and the other end abuts against the inner wall of the inner tube 1. In another embodiment, the elastic member 4 may be a spring. With such an arrangement, in some embodiments, the elastic member 4 may be placed in the inner cavity of the inner tube 1 without occupying the space between the inner tube 1 and the outer tube 2. Compared to the prior art in which both the elastic member 4 and the damping member 3 are arranged between the outer wall of the inner tube 1 and the inner wall of the outer tube 2, it is conducive to eliminating the gap between the inner tube 1, the damping sleeve 31 and the outer tube 2, and eliminating the vibration caused by the gap. In other alternative embodiments, the damping sleeve 31 may not need to be provided with a mounting base 32 and a mounting seat 33, and one end of the elastic member 4 passes through the notch on the inner tube 1 to directly abut against the damping sleeve 31, and the other end abuts against the inner wall of the inner tube 1.

In some embodiments of this embodiment, the mounting base 32, the mounting seat 33 and the damping sleeve 31 are an integrally formed structure, a notch is provided on the tube wall at the lower end of the inner tube 1, and the mounting seat 33 is integrally formed with the inner wall of the damping sleeve 31 and extends through the notch on the inner tube 1 to the inner cavity of the inner tube 1. In some embodiments, the mounting seat 33 is provided with a mounting groove with a lateral opening at one end, and there is a gap between the lateral opening of the mounting seat 33 and the tube wall of the inner tube 1. In some embodiments, a part of the elastic member 4 is arranged in the mounting groove, and the other part extends out of the opening of the mounting groove and abuts against the inner wall of the inner tube 1. In yet another embodiment, the structural form of arranging the elastic member 4 in the mounting groove in the mounting seat 33 may provide an installation space for the elastic member 4 and limit the elastic expansion direction, which is conducive to improving the stability of the installation structure of the elastic member 4.

In some embodiments, a mounting hole 11 is disposed at the tube wall of the inner tube 1, and a positioning boss 311 is integrally formed on the inner wall of the damping sleeve 31, which protrudes outward and can extend into the mounting hole 11. In some embodiments, the damping sleeve 31 may achieve positioning and mounting cooperation with the inner tube 1 by matching the positioning boss 311 on the inner wall of the damping sleeve 31 with the mounting hole 11 on the inner tube 1.

In some embodiments, the damping sleeve 31 may include a first damping sleeve 31*a* and a second damping sleeve 31*b* that are on the same circular ring and are independently arranged. In one example, the first damping sleeve 31*a* and the second damping sleeve 31*b* have a disconnection interval 313 between the two ends along the circumferential direction of the circular ring. In one embodiment, there may be at least two mounting holes 11 on the inner tube 1 and they are arranged oppositely. In some embodiments, the inner walls of the first damping sleeve 31*a* and the second damping sleeve 31*b* comprise positioning bosses 311 that protrude inward and may extend into the corresponding mounting holes 11. In some embodiments, the elastic expansion and contraction direction of the elastic member 4 is the same as the connecting direction of the two positioning bosses 311. In one aspect, this arrangement makes it convenient to install the first damping sleeve 31*a* and the second damping sleeve 31*b* on the ends of the inner tube 1 respectively, and the assembly operation of the damping sleeve 31 and the inner tube 1 is more convenient.

Furthermore, in some embodiments, the mounting base 32, the mounting seat 33 and the damping sleeve 31 are an integrally formed structure, and an elastic structure 314 that is arched inwardly to elastically abut against the outer wall of the inner tube 1 is integrally formed on the first damping sleeve 31*a*. in some embodiments, one end of the elastic member 4 abuts against the inner wall of the inner tube 1, so that the inner tube 1, the second damping sleeve 31*b* and the outer tube 2 fit tightly, eliminating the gap between the inner tube 1, the second damping sleeve 31*b* and the outer tube 2. In some embodiments, the other end of the elastic member 4 abuts against the first damping sleeve 31*a* through the mounting seat 33, so that the first damping sleeve 31*a* and the outer tube 2 fit tightly, eliminating the gap between the first damping sleeve 31*a* and the outer tube 2. Aspects of the invention overcome the shortcomings of the prior art; if the inner tube 1 fits against the second damping sleeve 31*b* under the action of the elastic member 4, it is bound to cause an increase in the gap between the inner tube 1 and the first damping sleeve 31*a* on the other side, and the existence of this gap may also cause the telescopic rod to set an elastic structure 314 that arches inward on the first damping sleeve 31*a*, and the elastic structure 314 can offset the outer wall of the inner tube 1 elastically, thereby perfectly eliminating the gap between the inner tube 1 and the first damping sleeve 31*a*. In one embodiment, aspects of the invention not only make the overall telescopic rod structure less likely to vibrate due to the gap, but also maintain a close fit between the various components when there is a small amount of processing error in the inner tube 1, the outer tube 2, the first damping sleeve 31*a*, and the second damping sleeve 31*b*, greatly reducing the dimensional accuracy control requirements for the inner tube 1, the outer tube 2, the first damping sleeve 31*a*, and the second damping sleeve 31*b*, which is conducive to reducing costs.

In some embodiments of this embodiment, two positioning ribs 5 are provided on the inner wall of the outer tube 2 on the same ring as the damping sleeve 31, and the two positioning ribs 5 pass through the disconnection interval 313 between the corresponding damping sleeves 31. In some embodiments, the positioning ribs 5 play a role in guiding the movement of the damping sleeve 31, facilitating the damping sleeve 31 and the inner tube 1 to slide along the positioning ribs 5 on the outer tube 2.

In some embodiments, the mounting hole 11 on the inner tube 1 is opened on the positioning rib 5 of the inner tube 1, and the positioning boss 311 of the damping sleeve 31 comprises a reinforcing boss 312 coaxially arranged with the positioning rib 5 on the inner tube 1, and the inner wall surface of the reinforcing boss 312 protrudes from the inner wall surface of the inner tube 1. In this way, according to some embodiments, the mounting boss on the damping sleeve 31 may be thickened according to the size of the positioning rib 5, so that the connection strength between the damping sleeve 31 and the inner tube 1 is stronger, more resistant to the impact of the telescopic rod 100 when repeatedly pulled and pulled, which is conducive to improving the service life of the telescopic rod 100.

In some embodiments, the connection direction of the two disconnected intervals 313 may be perpendicular to the connection direction of the two positioning bosses 311, and the positioning rib 5 on the inner tube 1 and the positioning rib 5 on the outer tube 2 are staggered at about 90 degrees. With such arrangement, in some embodiments, the overall strength and stability of the telescopic rod 100 after being extended are higher. Compared with the arrangement of all ribs on the multi-section tube body in the existing telescopic rod 100 in the same direction, the problem that the inner tube 1 of the telescopic rod 100 is weakly supported in the direction without ribs and is prone to vibration is avoided.

In summary, the telescopic rod with an elastic damping structure provided by embodiments of the invention comprises a damping member 3 between the end of the inner tube 1 and the inner wall of the outer tube 2, and an elastic member 4 is provided between the damping member 3 and the inner wall of the inner tube 1. During the sliding of the inner tube 1 and the damping member 3 along the inner wall of the outer tube 2, in some embodiments, the elastic force of the elastic member 4 may act on the inner tube 1 and is transmitted to the outer tube 2 through the damping member 3, so that the inner tube 1, the damping member 3 and the outer tube 2 may be closely fitted, the matching gap between the three can be perfectly eliminated, and the vibration of the telescopic rod 100 caused by the matching gap between the internal tube bodies may be overcome.

Aspects of the invention provide more durable and stable support for the shooting device supported on the telescopic rod 100. Compared to the prior art practice of forming friction damping by using the deformation of the damping member 3 made of plastic material itself, this method of using the elastic member 4 to apply elastic force to the damping member 3 to form friction damping with the inner wall of the outer tube 2 to avoid the resistance attenuation caused by material fatigue and external temperature environment. Aspects of the invention is conducive to provide more durable and stable support for the shooting device supported on the telescopic rod 100. In addition, compared with the prior art method of controlling the magnitude of the damping force by high-precision control of the local deformation of the damping member 3, the dimensional accuracy control requirements for the inner diameter of each tube body and the inner and outer diameters of the damping member 3 are greatly reduced, and the overall processing and production of the telescopic rod 100 is more convenient and easy, with lower production costs, and may provide stable damping in different harsh environments for a long time, ensuring the performance of the product.

Obviously, the above embodiments are merely examples for the purpose of clear disclosure, and are not intended to limit the implementation. For those skilled in the art, other different forms of changes or modifications may be made based on the above description. It is not necessary and impossible to list all the implementation methods here. The obvious changes or modifications derived therefrom are still within the scope of protection of the invention.

What is claimed is:

1. A telescopic rod comprising:

an elastic damping structure comprising at least two sections of a tube, wherein the at least two sections are sleeved in sequence from inside to outside;

wherein the elastic damping structure is arranged between two adjacent sections of the tube; wherein the two adjacent sections of the tube comprise an inner tube and an outer tube;

wherein the elastic damping structure comprises a damping member and an elastic member;

wherein the damping member is arranged between an end of the inner tube and an inner wall of the outer tube;

wherein the damping member comprises two damping sleeves, wherein a portion of the two damping sleeves is disposed between the outer wall of the inner tube and the inner wall of the outer tube, a mounting base plate connected to each of the two damping sleeves and extending toward the end surface of the inner tube, and a mounting seat extending into an inner cavity of the inner tube disposed on the mounting base plate;

wherein the elastic member is placed inside the mounting seat entirely within the inner cavity of the inner tube without occupying space between the inner tube and the outer tube;

wherein one end of the elastic member is configured to abut against the mounting seat of a first damping sleeve of the two damping sleeves and the other end is configured to abut against the mounting seat of a second damping sleeve of the two damping sleeves;

wherein an elastic force of the elastic member is configured to drive the inner tube, the damping member and the outer tube to fit closely and form a friction damping with the damping member and the inner wall of the outer tube;

wherein the inner tube is configured to slide along an inner wall surface of the outer tube through the damping member and is configured to maintain in a relative position after sliding through the damping member.

2. The telescopic rod according to claim 1;

wherein the mounting base comprises a mounting seat extending into an inner cavity of the inner tube, wherein one end of the elastic member is in contact with the mounting seat, and the other end is in contact with the inner wall of the inner tube.

3. The telescopic rod according to claim 2, further comprising a mounting groove with an opening at one end in the mounting seat, wherein a part of the elastic member is arranged in the mounting groove, and the other part extends out of the opening of the mounting groove to abut against the inner wall of the inner tube.

4. The telescopic rod according to claim 2, further comprising a mounting hole disposed at a tube wall of the inner tube, and further comprising a positioning boss disposed at the inner wall of the damping sleeve, wherein the positioning boss protrudes outward and extends into the mounting hole.

5. The telescopic rod according to claim 1, wherein the first damping sleeve comprises an elastic structure arching inwardly to elastically resist the outer wall of the inner tube.

6. The telescopic rod according to claim 1, wherein the connection direction of two disconnection intervals is perpendicular to the connection direction of the two positioning bosses.

7. The telescopic rod according to claim 6, further comprising a pair of positioning ribs being disposed at the inner wall of the outer tube and are on the same circle as the two damping sleeves, and wherein the two positioning ribs pass through the disconnection intervals between the two damping sleeves at corresponding positions.

8. The telescopic rod according to claim 7, wherein the mounting hole on the inner tube is disposed at the positioning rib of the inner tube.

9. The telescopic rod according to claim 8, further comprising a reinforcing rib disposed at the positioning boss of the two damping sleeves and coaxially arranged with the positioning rib on the inner tube; and wherein the inner wall surface of reinforcing boss is configured to protrude from the inner wall surface of the inner tube.

10. The telescopic rod according to claim 7, wherein the positioning rib on the inner tube and the positioning rib on the outer tube are arranged at about 90 degrees.

* * * * *